(12) United States Patent
Muraki et al.

(10) Patent No.: US 10,658,660 B2
(45) Date of Patent: May 19, 2020

(54) NICKEL-METAL HYDRIDE BATTERY

(71) Applicant: PRIMEARTH EV ENERGY CO., LTD., Kosai-shi, Shizuoka (JP)

(72) Inventors: Suguru Muraki, Kosai (JP); Yuki Sakito, Toyohashi (JP); Hiroyuki Sakamoto, Toyohashi (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 204 days.

(21) Appl. No.: 15/712,078

(22) Filed: Sep. 21, 2017

(65) Prior Publication Data

US 2018/0090754 A1    Mar. 29, 2018

(30) Foreign Application Priority Data

Sep. 26, 2016  (JP) ................. 2016-186974
May 17, 2017   (JP) ................. 2017-098285

(51) Int. Cl.
*H01M 4/38*    (2006.01)
*H01M 10/44*   (2006.01)
*H01M 4/24*    (2006.01)
*H01M 4/36*    (2006.01)
*H01M 10/34*   (2006.01)
(Continued)

(52) U.S. Cl.
CPC ............ *H01M 4/385* (2013.01); *C22C 19/03* (2013.01); *H01M 4/242* (2013.01); *H01M 4/362* (2013.01); *H01M 10/345* (2013.01); *H01M 10/44* (2013.01); *H01M 2010/4292* (2013.01)

(58) Field of Classification Search
CPC ............................ H01M 4/385; H01M 4/242
See application file for complete search history.

(56) References Cited

U.S. PATENT DOCUMENTS

2004/0170520 A1    9/2004  Maeda et al.
2006/0046141 A1*   3/2006  Yasuoka ............... H01M 4/383
                                                        429/218.2
2006/0188385 A1    8/2006  Mukai et al.
(Continued)

FOREIGN PATENT DOCUMENTS

CN    1658412 A    8/2005
CN    1741305 A    3/2006
(Continued)

OTHER PUBLICATIONS

Machine translation of JP2000-149933A (Year: 2019).*
(Continued)

*Primary Examiner* — Maria Laios
(74) *Attorney, Agent, or Firm* — Maschoff Brennan

(57) ABSTRACT

A nickel-metal hydride battery is provided with a positive electrode and a negative electrode including hydrogen absorbing alloys. The hydrogen absorbing alloys of the negative electrode include a first hydrogen absorbing alloy and a second hydrogen absorbing alloy having a higher hydrogen equilibrium dissociation pressure than the first hydrogen absorbing alloy. Each hydrogen absorbing alloy includes an element A having high affinity for hydrogen and an element B having low affinity for hydrogen. The ratio of a substance amount of the element B to a substance amount of the element A is greater in the second hydrogen absorbing alloy than the first hydrogen absorbing alloy.

10 Claims, 5 Drawing Sheets

(51) Int. Cl.
  *H01M 10/42*  (2006.01)
  *C22C 19/03*  (2006.01)

(56) References Cited

U.S. PATENT DOCUMENTS

2014/0205906 A1* 7/2014 Kudo .................. H01M 4/32
                                                    429/223
2016/0285087 A1   9/2016 Muraki et al.

FOREIGN PATENT DOCUMENTS

| CN | 1833039 A     |   | 9/2006  |
|----|---------------|---|---------|
| JP | H05-156382 A  |   | 6/1993  |
| JP | H06231738 A   |   | 8/1994  |
| JP | H10-326613 A  |   | 12/1998 |
| JP | 2000149933 A  | * | 5/2000  |
| JP | 2000149933 A  |   | 5/2000  |
| JP | 2005108610 A  |   | 4/2005  |
| JP | 2013-164991 A |   | 8/2013  |
| JP | 2016-186844 A |   | 10/2016 |

OTHER PUBLICATIONS

Cunfu et al., "Function of Co and Mn in the LaNi5 Hydrogen-Storage Alloy" Rare Metal Materials and Engineering, vol. 28, No. 6, Dec. 1999.
CN Office Action in application No. 201710866166.5 dated Sep. 30, 2019.

* cited by examiner

| Evaluation Parameter | | Example 1 | Comparative Example 1 |
|---|---|---|---|
| Hydrogen Absorbing Amount | | 0.847 | 0.842 |
| Initial DC-IR | 25℃ | 102.4% | 100% |
| | -30℃ | 102.5% | 100% |
| High-Rate Internal Pressure (After 250 Cycles) | | 141.6% | 100% |
| DC-IR After Durability Test | 25℃ | 102.4% | 100% |
| | -30℃ | 103.7% | 100% |

NICKEL-METAL HYDRIDE BATTERY

CROSS-REFERENCE TO RELATED APPLICATIONS

This application is based upon and claims the benefit of priority from prior Japanese Patent Applications No. 2016-186974, filed on Sep. 26, 2016 and No. 2017-098285, filed on May 17, 2017, the entire contents of which are incorporated herein by reference.

BACKGROUND

The present invention relates to a nickel-metal hydride battery.

In general, nickel-metal hydride batteries, which have high energy density and excellent reliability, are widely used as power sources for portable devices and mobile devices and as power sources for electric vehicles and hybrid vehicles. A nickel-metal hydride battery includes a positive electrode of which the main component is nickel hydroxide, a negative electrode of which the main component is hydrogen absorbing alloy, and an alkali electrolyte solution.

When the nickel-metal hydride battery is charged and discharged, the hydrogen absorbing alloy absorbs and desorbs hydrogen. When hydrogen is repeatedly absorbed and desorbed, the hydrogen absorbing alloy expands and contracts. This pulverizes the hydrogen absorbing alloy. The pulverized hydrogen absorbing alloy is corroded by an alkali electrolyte solution. The corrosion advances as the surface area of the pulverized hydrogen absorbing alloy increases. This shortens the lifetime of the hydrogen absorbing alloy. A technique that limits the pulverization of the hydrogen absorbing alloy to improve the corrosion resistance of the hydrogen absorbing alloy against alkali electrolyte solution has been proposed in the prior art (for example, see Japanese Laid-Open Patent Publication No. 5-156382.

SUMMARY

In contrast, the pulverization of the hydrogen absorbing alloy increases the surface area of the hydrogen absorbing alloy. This also increases the exposed area of a highly conductive metal (such as nickel) included in the hydrogen absorbing alloy, and the exposed metal acts as a catalyst for reaction. The exposure of a large amount of the highly conductive metal leads lowers internal resistance of the negative electrode and improves the power output characteristic of the nickel-metal hydride battery.

In this manner, in the prior art, the pulverization of the hydrogen absorbing alloy results in a trade-off between the improvement of the output characteristic and the improvement of the corrosion resistance. It is difficult for the output characteristic and the corrosion resistance to be both improved.

One aspect of the present invention is a nickel-metal hydride battery provided with a positive electrode and a negative electrode including hydrogen absorbing alloys. A a capacity of the negative electrode includes a discharge reserve that is a capacity exceeding a capacity of the positive electrode. The hydrogen absorbing alloys of the negative electrode include a first hydrogen absorbing alloy and a second hydrogen absorbing alloy having a hydrogen equilibrium dissociation pressure than the first hydrogen absorbing alloy. Each hydrogen absorbing alloy includes an element A having high affinity for hydrogen and an element B having low affinity for hydrogen. When a ratio of a substance amount of the element B to a substance amount of the element A is referred to as an AB ratio, the AB ratio of the second hydrogen absorbing alloy is greater than an AB ratio of the first hydrogen absorbing alloy. A proportion of the first hydrogen absorbing alloy in all of the hydrogen absorbing alloys is less than a sum of a proportion of the discharge reserve in the entire capacity of the negative electrode and a proportion of a capacity of a portion corresponding to a lower limit value of 0% or greater of a charge rate of the positive electrode in the negative electrode in the entire capacity of the negative electrode.

Other aspects and advantages of the present invention will become apparent from the following description, taken in conjunction with the accompanying drawings, illustrating by way of example the principles of the invention.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
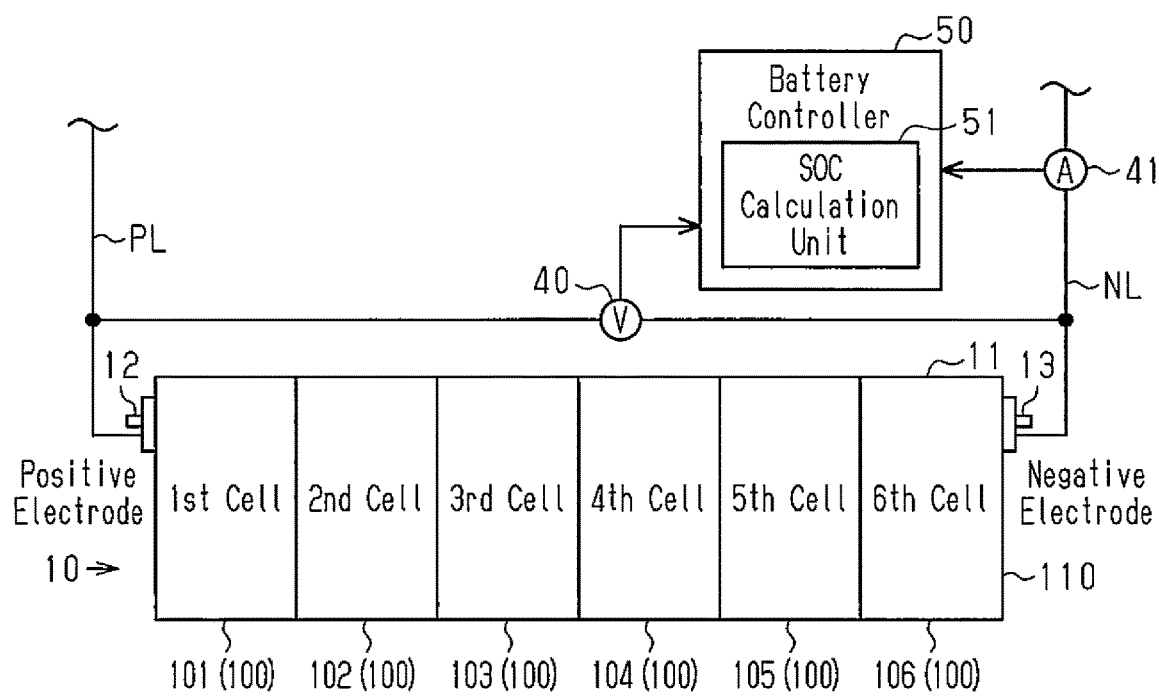
FIG. 1 is a block diagram showing the configuration of one embodiment of a nickel-metal hydride battery.

One embodiment of a nickel-metal hydride battery will now be described.

First, a battery 10 installed in a hybrid vehicle will be described with reference to FIG. 1. In this embodiment, the battery 10 is electrically connected to an electric motor as a power source for the electric motor. The battery 10 is also electrically connected to an electric generator, and charged by the power generated by driving the electric generator. When a hybrid vehicle in which the battery 10 is installed is a plug-in hybrid vehicle which allows the battery 10 to be charged by the power transmitted from an external power source, the battery 10 is connected to an on-board charger which is connected to the external power source.

The battery 10 is an assembled battery including battery modules 11 that are electrically connected in series or in parallel. Each battery module 11 includes a plurality of single batteries 100. The single batteries 100 are nickel-metal hydride batteries each including a negative electrode including a hydrogen absorbing alloy and a positive electrode including nickel hydroxide.

The battery modules 11 each include a resin case 110, and six battery containers are provided in the case 110. The six battery containers correspond to first to sixth cells 101 to 106, which are the single batteries 100. The battery modules 11 each include a positive electrode terminal 12 and a negative electrode terminal 13 that electrically connect the first cell 101 to the sixth cell 106 in series as input and output terminals uses for charging and discharging. An electric motor (not shown) is connected to the positive electrode terminal 12 and the negative electrode terminal 13 by a positive line PL and a negative line NL.

A voltmeter 40 for measuring voltage between the terminals is electrically connected between the positive electrode terminal 12 and the negative electrode terminal 13. An ammeter 41 for measuring input and output current is electrically connected in series to the battery modules 11 via the negative line NL. The voltmeter 40 outputs a signal corresponding to the measured voltage between the terminals to a battery controller 50. The ammeter 41 outputs a signal corresponding to the measured current to the battery controller 50.

In FIG. 1, a single voltmeter 40 is connected to each of the battery modules 11. However, a single voltmeter 40 may be connected to a plurality of the battery modules 11 to obtain a voltage of each of the battery modules 11 from the voltage measured by the voltmeter 40. The ammeter 41 may also be connected to a plurality of the battery modules 11 to obtain a current of each of the battery modules 11 from the current measured by the ammeter 41.

The battery controller 50 is configured by a computer including a processor and a memory to perform various kinds of processing through arithmetic operation processing at the processor for the program stored in the memory. The battery controller 50 includes an SOC calculation unit 51. The SOC calculation unit 51 calculates a state of charge (hereinafter abbreviated as "SOC"), which is a charge rate of the battery 10, using the voltage based on the signal supplied from the voltmeter 40 and the current based on the signal supplied from the ammeter 41.

The charge and discharge of the battery 10 are controlled within an SOC control range defined as a control range in hybrid vehicles. The battery controller 50 outputs a signal corresponding to the SOC calculated by the SOC calculation unit 51 to an electric motor controller (not shown) for controlling an electric motor. The electric motor controller controls the charging and discharging of the battery 10 based on the signal supplied from the battery controller 50. For example, in hybrid vehicles equipped with an electric generator which generates power by the motive power of an engine, the engine is driven so that the SOC of the battery 10 would not be below the lower limit of the SOC control range, and the electric motor is driven so that the SOC of the battery 10 would not be beyond the upper limit of the SOC control range.

Figure 2:
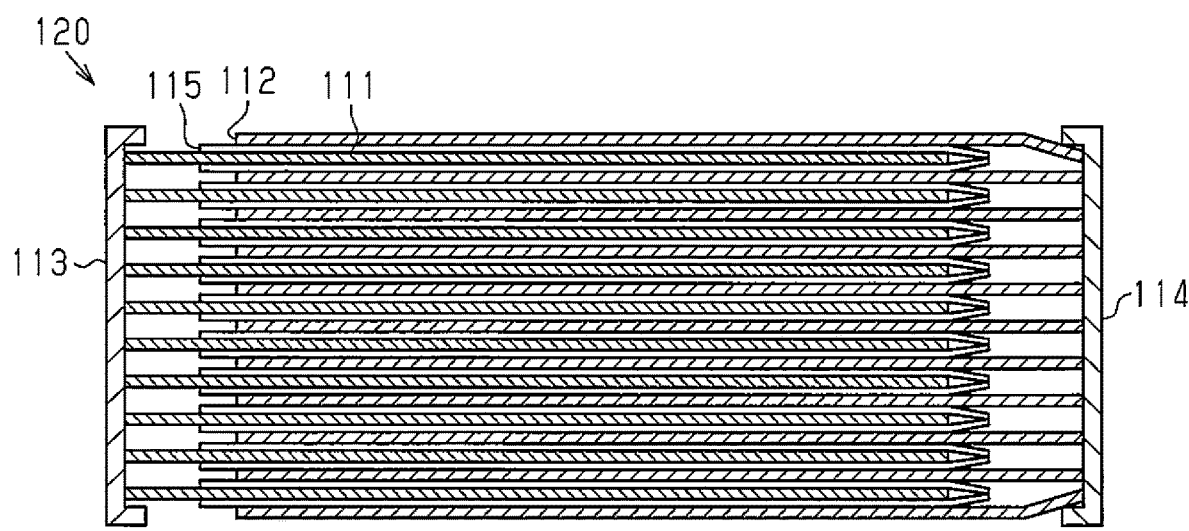
FIG. 2 is a cross-sectional view showing an end surface of an electrode plate group in one embodiment of a nickel-metal hydride battery.

As shown in FIG. 2, the single batteries 100 each include an electrode plate group 120, an electrolyte solution (not shown), a positive electrode current collecting plate 113 and a negative electrode current collecting plate 114. The electrode plate group 120 includes a plurality of separators 115, a plurality of flat positive electrode plates 111 and a plurality of flat negative electrode plates 112. In the electrode plate group 120, the plurality of positive electrode plates 111 and the plurality of negative electrode plates 112 are alternately stacked with separators 115 arranged in between. Ends of the positive electrode plates 111 are bonded to the positive electrode current collecting plate 113 by a bonding method such as welding. End parts of the negative electrode plates 112 are bonded to the negative electrode current collecting plate 114 by a bonding method such as welding.

Each of the positive electrode plates 111 has a substrate made of a three-dimensional porous body and a positive electrode mixture carried on the substrate. The substrate is preferably made of a foamed metal. For example, foamed nickel can be used as the foamed metal. This substrate has the function of a carrier which carries the positive electrode mixture and the function of a current collector. The positive electrode mixture includes a positive electrode active substance including nickel hydroxide as the main component, a conducting agent, and the like.

Each of the negative electrode plates 112 has a core material and a negative electrode mixture carried on the core material. The negative electrode mixture contains a hydrogen absorbing alloy. A hydrogen absorbing alloy refers to an alloy or an intermetallic compound which reversibly absorbs/desorbs hydrogen at a usage temperature and under a usage pressure. The kind of the hydrogen absorbing alloy is not particularly limited, and there can be used, for example, misch metals which are mixtures of rare earth elements, calcium-based hydrogen absorbing alloys including calcium (Ca) and any other transition metal as the main components, rare-earth hydrogen absorbing alloys including a rare earth element such as lanthanum (La) or cerium (Ce) and any other transition metal as the main components, magnesium-based hydrogen absorbing alloys including magnesium as the main component, titanium-based hydrogen absorbing alloys including titanium and any other transition metal as the main components, zirconium-based hydrogen absorbing alloys including zirconium and any other transition metal as the main components, and Laves phase hydrogen absorbing alloys having the Laves phase structure. When an element having strong affinity for hydrogen is defined as element "A" and an element having weak affinity for hydrogen is defined as element "B," i.e., when the affinity for hydrogen of the element "A" is stronger than the affinity for hydrogen of the element "B," the hydrogen absorbing alloy may be an $AB_5$-type hydrogen absorbing alloy having an $AB_5$-type composition, an $AB_2$-type hydrogen absorbing alloy having an $AB_2$-type composition, an AB-type hydrogen absorbing alloy having an AB-type composition, or a hydrogen absorbing alloy of any other type.

The hydrogen absorbing alloy in the negative electrode mixture preferably contains an especially highly conductive metal among metals which form the hydrogen absorbing alloy. An example of such an especially highly conductive metal (highly conductive metal) includes nickel (Ni). This hydrogen absorbing alloy is represented, for example, by $MmNi_xM_y$ (wherein x and y are real numbers, and Mm is a misch metal).

The negative electrode mixture contains, in addition to the hydrogen absorbing alloy, a thickener such as carboxymethyl cellulose and a binder such as a styrene-butadiene copolymer. The negative electrode plate 112 is produced by mixing these materials, processing the mixture into a paste and charging the paste material into the core material such as a punching metal, followed by drying, rolling and cutting.

Discharge reactions at the positive electrode and negative electrode of this nickel-metal hydride battery are as represented by following half-reactions (1) and (2). At the time of charge, the reactions progress in a reverse direction. At the negative electrode, the hydrogen absorbing alloy is dehydrogenated at the time of discharge, and hydrogenated during charging.

$$\text{Positive Electrode: } NiOOH + H_2O + e^- \rightarrow Ni(OH)_2 + OH^- \quad (1)$$

$$\text{Negative Electrode: } MH + OH^- \rightarrow M + H_2O + e^- \quad (2)$$

Figure 3:
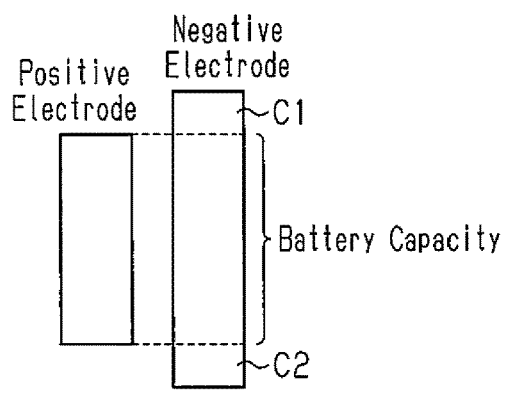
FIG. 3 is a schematic diagram view showing the balance between a positive electrode capacity and a negative electrode capacity in a nickel-metal hydride battery.

As shown in FIG. 3, the single battery 100 is set under positive electrode restriction in which the negative electrode capacity is greater than the positive electrode capacity and the battery capacity is restricted by the positive electrode capacity. In an initial state, such as when shipped out of the factory, a charge reserve C1 which is a residual charge capacity when the positive electrode is fully charged and a discharge reserve C2 which is a residual discharge capacity when the SOC of the positive electrode is 0% are ensured in the negative electrode capacity. Also, in the initial state, the positive electrode capacity and the negative electrode capacity of each of the single batteries 100 which form the battery module 11 are brought in a balanced state. The term "full charge" as used herein for the positive electrode refers to a state in which the positive electrode active substance in the single battery 100 has no uncharged portion. At this time, the SOC of the positive electrode is 100%. A state in which the SOC of the positive electrode has arrived at 0%, i.e., state in which the positive electrode active substance has no charged portion, is defined as the state in which the SOC of the single battery 100 is 0%. A state in which the SOC of the positive electrode has arrived at 100% is defined as the state in which the SOC of the single battery 100 is 100%. Thus, the charge reserve C1 is provided in the negative electrode capacity, so that it is possible to suppress the generation of hydrogen from the negative electrode at the time of overcharge. The discharge reserve C2 is provided in the negative electrode capacity, so that it is possible to suppress the generation of oxygen from the negative electrode during overdischarging.

Next, the hydrogen absorbing alloy included in the negative electrode will be described in detail. The hydrogen absorbing alloy according to this embodiment is formed by mixing two kinds of alloys, i.e., a first hydrogen absorbing alloy having a low hydrogen equilibrium dissociation pressure and high pulverizability and a second hydrogen absorbing alloy having a high hydrogen equilibrium dissociation pressure and low pulverizability.

First, the pulverizability of a hydrogen absorbing alloy will be described. In general, a hydrogen absorbing alloy includes hydrogen atoms between the lattices of its metal, in association with charge of the battery, absorbs the hydrogen atoms, and is thus hydrogenated. Also, a hydrogen absorbing alloy desorbs the hydrogen atoms included between the lattices of its metal, in association with discharge of the battery, and is thus dehydrogenated. Repeated hydrogenation and dehydrogenation cause a lattice defect, leading to impaired crystallinity, so that the alloy is changed into fine powder (pulverized). A hydrogen absorbing alloy tends to be further pulverized into finer particles as the number of repetitions of hydrogenation and dehydrogenation increases. The likelihood of this pulverization varies depending on the kind of alloy. Hereinafter, the likelihood of this pulverization is referred to as pulverizability.

The pulverized hydrogen absorbing alloy has an increased contact area with an alkaline electrolyte solution. As the contact area with the electrolyte solution increases, the hydrogen absorbing alloy is more likely to be corroded. When the hydrogen absorbing alloy is pulverized, a greater quantity of a highly conductive metal such as nickel is exposed. Since the increase in the exposed area of the highly conductive metal described as above lowers the internal resistance of the negative electrode mixture, the output of the single battery 100 is improved.

When the ratio of the substance amount (mole number) of the element B to the substance amount of the element A included in the hydrogen absorbing alloy (substance amount of element B/substance amount of element A) is referred to as the AB ratio. The AB ratio is correlated with pulverizability. The AB ratio of the first hydrogen absorbing alloy is smaller than that of the second hydrogen absorbing alloy. In other words, the first hydrogen absorbing alloy has a large proportion of the element A as compared to the second hydrogen absorbing alloy. Element A is an element that easily forms a hydrogenated product. Thus, due to the presence of a larger amount of the element A, hydrogen atoms are likely to be absorbed in the crystal lattice of the alloy. When a hydrogen absorbing alloy absorbs hydrogen atoms, its volume significantly expands, whereby the alloy is distorted and pulverized. Accordingly, hydrogen absorbing alloys which are likely to absorb hydrogen atoms have high pulverizability. For example, in the case of an $AB_5$-type hydrogen absorbing alloy, the element A is La, Ce, Nd or the like, and the element B is Ni, Co, Mn, Al or the like. In the case of an $AB_2$-type hydrogen absorbing alloy, the element A is Mg, Zr or the like, and the element B is Zn, Ni or the like. In the case of an AB-type hydrogen absorbing alloy, the element A is Ti or the like, and the element B is Fe, Co or the like.

The AB ratio of the first hydrogen absorbing alloy falls within the range of 4.8 or greater and 5.2 or less. The AB ratio of the second hydrogen absorbing alloy falls within the range of 5.2 or greater and 5.4 or less. When "X" represents a theoretical positive electrode capacity, "Y" represents a theoretical negative electrode capacity, and "AB" represents the AB ratio, both the AB ratio of the first hydrogen absorbing alloy and the AB ratio of the second hydrogen absorbing alloy fall within the range of 1.25 or greater and 1.4 or less. The theoretical positive electrode capacity is a designated capacity of positive electrode, and the theoretical negative electrode capacity is a designated capacity of negative electrode. When the charge reserve and the discharge reserve are provided, the theoretical capacity includes the charge reserve and the discharge reserve.

When the first hydrogen absorbing alloy and second hydrogen absorbing alloy are $AB_5$-type hydrogen absorbing alloys, the AB ratio of the first hydrogen absorbing alloy is smaller than the second hydrogen absorbing alloy by at least 0.1. A hydrogen absorbing alloy having a small AB ratio has high pulverizability and a low hydrogen equilibrium dissociation pressure. Thus, a proper potential difference is produced between the potential of the first hydrogen absorbing alloy and the potential of the second hydrogen absorbing alloy when charging or discharging starts. Therefore, if the SOC of the battery 10 is controlled to be in a range of a lower limit value or greater preset at the charge rate of the positive electrode determined based on the control range of the battery 10, the starting of the hydrogenation of the first hydrogen absorbing alloy in the middle of charge and the starting of the dehydrogenation of the first hydrogen absorbing alloy during discharging can be limited. The difference between the AB ratio of the first hydrogen absorbing alloy and the AB ratio of the second hydrogen absorbing alloy is adjusted to 0.1 or greater. This sufficiently improves the internal resistance decreasing effect.

An $AB_5$-type hydrogen absorbing alloy has a $CaCu_5$-type crystalline structure having a hexagonal main phase. A $CaCu_5$-type includes a unit lattice in which the length of axis a and the length of axis b in the lattice constant are identical and an angle formed between the axis a and the axis b therein is 120 degrees. An $AB_2$-type hydrogen absorbing alloy has a hexagonal or cubic main phase, in which at least the length of axis a and the length of axis b are identical with each other. An AB-type hydrogen absorbing alloy has a CsCl-type crystalline structure having a cubic main phase, in which at least the length of axis a and the length of axis b are identical with each other. A hydrogen absorbing alloy having high crystallinity has a short length of axis a and a short length of axis b, and is difficult to be pulverized. The lengths of the axis a and axis b of the first hydrogen absorbing alloy may be, for example, 5.04 Å or greater and 5.06 Å or less, and preferably 5.0484 Å or greater and 5.0512 Å or less. The lengths of the axis a and axis b of the second hydrogen absorbing alloy may be, for example, 5.00 Å or greater and 5.03 Å or less, and preferably 5.0180 Å or greater and 5.0224 Å or less. The lengths of the axis a and axis b of the first hydrogen absorbing alloy are longer than the lengths of the axis a and axis b of the second hydrogen absorbing alloy, and the difference therebetween is 0.02 Å or greater. Thus, the difference in length of the axis a between the first hydrogen absorbing alloy and the second hydrogen absorbing alloy and the difference in length of the axis b therebetween are adjusted to 0.02 Å or greater, so that a clear difference in pulverizability is caused.

The axis a (and axis b) in the lattice constant of the hydrogen absorbing alloy can be measured in the following manner. First, a hydrogen absorbing alloy having a particle diameter of 500 μm or less is prepared, and the alloy is crushed with a crusher for 1 minute. The crushed hydrogen absorbing alloy is classified with a 20-μm sieve, and the hydrogen absorbing alloy classified with the sieve is used as a sample. Further, the length of axis a is measured by the X ray diffraction method. The measurement conditions are, for example, radiation source: $CuK\alpha$, tube current: 40 mA, tube voltage: 35 kV, diffraction angle $2\theta$: 20° or greater and 120° or less, scanning speed: 0.28 sec/step, step width: 0.00730° and number of steps: 13624.

Further, the mixing of cobalt with the hydrogen absorbing alloy can prevent lattice expansion caused by the hydrogenation of the hydrogen absorbing alloy to limit pulverization and also limit the elution of manganese. The cobalt content of the first hydrogen absorbing alloy is preferably 0 or greater and 0.1 mol/g or less, and the cobalt content of the second hydrogen absorbing alloy is preferably 0.15 mol/g or greater and 0.5 mol/g or less. The cobalt content of the second hydrogen absorbing alloy is preferably greater than that of the first hydrogen absorbing alloy. Further, the first hydrogen absorbing alloy preferably does not contain cobalt. Thus, the cobalt content of the second hydrogen absorbing alloy is greater than that of the first hydrogen absorbing alloy so that it is possible to lower the pulverization of the second hydrogen absorbing alloy. The cobalt content of the second hydrogen absorbing alloy is preferably 1% by weight or greater than that of the first hydrogen absorbing alloy. Thus, the cobalt content of the second hydrogen absorbing alloy is greater, and, at the same time, the first hydrogen absorbing alloy and the second hydrogen absorbing alloy are differentiated in cobalt content, so that it is possible to cause a proper potential difference between the potential of the first hydrogen absorbing alloy and the potential of the second hydrogen absorbing alloy at the start of charge and discharge.

The pulverizability can be evaluated, for example, by the average of the surface area or particle diameter of the hydrogen absorbing alloy after repetition of charge and discharge in a predetermined number of times. The pulverizability can also be evaluated by the magnetic susceptibility of the hydrogen absorbing alloy after repetition of charge and discharge in a predetermined number of times. The magnetic susceptibility is intended to measure the magnetic moment of a sample, and it can be said that the degree of pulverization of hydrogen absorbing alloy is greater as the magnetic susceptibility is higher. The magnetic susceptibility can be measured using a Vibrating Sample Magnetometer (VSM).

Figure 4:
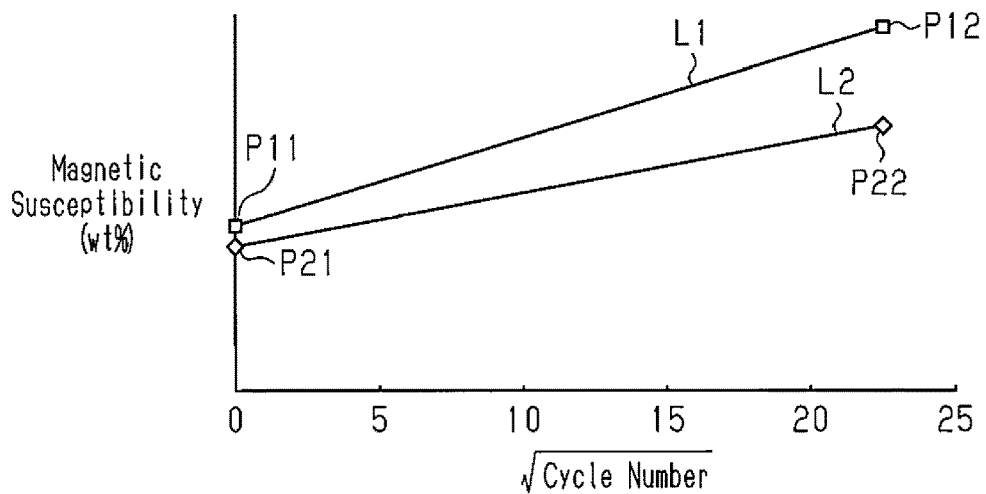
FIG. 4 is a graph showing the magnetic susceptibility of a first hydrogen absorbing alloy and the magnetic susceptibility of a second hydrogen absorbing alloy.

FIG. 4 shows a magnetic susceptibility change line L1 which indicates a change in the magnetic susceptibility of the first hydrogen absorbing alloy and a magnetic susceptibility change line L2 which indicates a change in the magnetic susceptibility of the second hydrogen absorbing alloy in association with charge and discharge. The magnetic susceptibility change line L1 indicates the magnetic susceptibility of the first hydrogen absorbing alloy when the first hydrogen absorbing alloy alone is used as the hydrogen absorbing alloy to prepare a single battery, and the magnetic susceptibility change line L2 indicates the magnetic susceptibility of the second hydrogen absorbing alloy when the second hydrogen absorbing alloy alone is used as the hydrogen absorbing alloy to prepare a single battery.

On the magnetic susceptibility change lines L1, L2, plot points P11, P21 each indicate the magnetic susceptibility after an initial activation step of repeating the charge until the SOC of the positive electrode is changed from "0%" to "100%" and the discharge until the SOC of the positive electrode reaches "0%," respectively, ten times. The plot points P12, P22 each indicate the magnetic susceptibility of the hydrogen absorbing alloy after execution of the initial activation step and 500 cycles of a durability test. The durability test is, for example, a test in which charge and discharge within a range for the SOC of the positive electrode of 20% or greater and 80% or less are carried out in one cycle. The magnetic susceptibility change line L1 is a straight line passing through the plot points P11, P12, and the magnetic susceptibility change line L2 is a straight line passing through the plot points P21, P22. From the magnetic susceptibility change lines L1, L2, it can be understood that the pulverization of the first hydrogen absorbing alloy in association with charge and discharge rapidly progresses as compared with the second hydrogen absorbing alloy.

Next, a hydrogen equilibrium dissociation pressure will be described. The hydrogen absorption characteristics of the hydrogen absorbing alloy vary depending on the type of the hydrogen absorbing alloy. The hydrogen absorption characteristics include a hydrogen absorption amount (H/M) which is an amount of hydrogen contained per unit amount, hysteresis in which a difference is caused between the hydrogen absorption pressure and the hydrogen desorption pressure, and a hydrogen equilibrium dissociation pressure which is a hydrogen pressure when the hydrogenation reaction and the dehydrogenation reaction are brought into an equilibrium state.

The hydrogen equilibrium dissociation pressure is calculated from a Pressure-Composition-Temperature (PCT) line as a pressure-composition isotherm obtained by absorbing hydrogen in a hydrogen absorbing alloy, which line is generated by, for example, a method in accordance with JISH7201 or any other method. When generating the PCT line, a pretreated hydrogen absorbing alloy is put in a measurement container; the inside of the measurement container is vacuum-degassed for dehydrogenation of the hydrogen absorbing alloy; and then hydrogen gas is introduced until the pressure in the inside of the measurement container reaches a predetermined pressure. Then, the measurement container is left until the inside thereof is brought in an equilibrium state, and, thereafter, the hydrogen gas pressure is measured. This measurement is repeated in a predetermined number of times while the amount of the hydrogen gas to be introduced is changed. Then, the measured pressure is input in the predetermined equation to obtain the PCT line. A flat region in this PCT line is defined as a hydrogen equilibrium dissociation pressure (plateau pressure). Incidentally, the hydrogen equilibrium dissociation pressure may be obtained from the PCT line when the hydrogen absorbing alloy desorbs hydrogen.

As the hydrogen equilibrium dissociation pressure measured under constant conditions is higher, the negative electrode potential at which hydrogenation and dehydrogenation are started becomes closer to the negative electrode potential at the full-charge state. Therefore, though such control is not carried out in an actual use state of the battery 10, when the negative electrode is charged until the SOC thereof is changed from "0%" to "100%," the hydrogenation reaction of the first hydrogen absorbing alloy is started and progresses first, and the hydrogenation reaction of the second hydrogen absorbing alloy is then started. When the negative electrode is discharged until the SOC thereof is changed from "100%" to "0%", the dehydrogenation reaction of the second hydrogen absorbing alloy is started and progresses first, and the dehydrogenation reaction of the first hydrogen absorbing alloy is then started.

Figure 5:
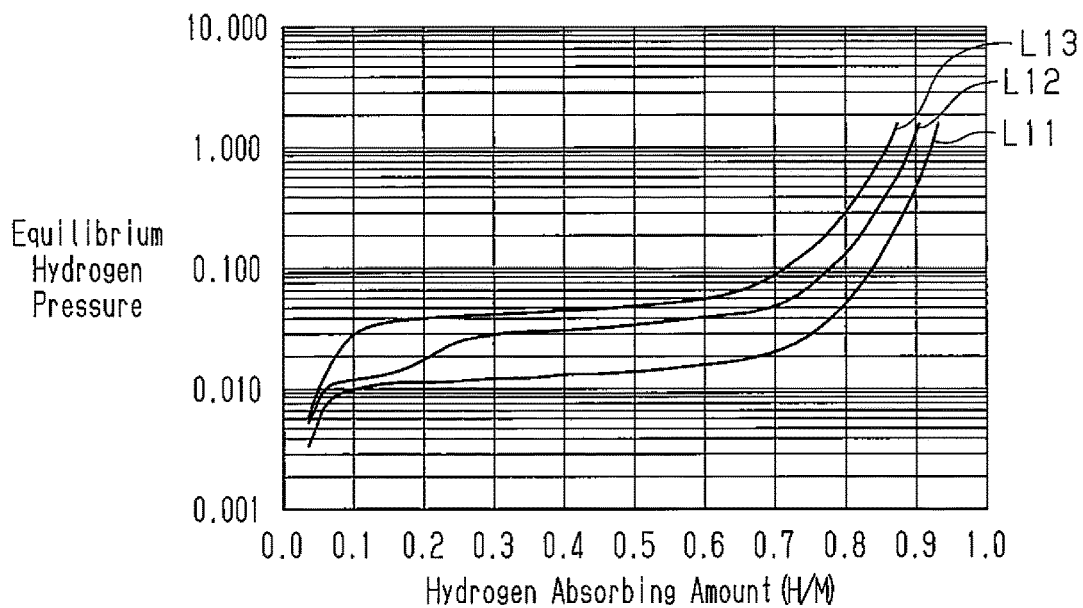
FIG. 5 is a graph showing the Pressure-Composition-Temperature (PCT) lines of a first hydrogen absorbing alloy, a second hydrogen absorbing alloy, and a mixture of the first and second hydrogen absorbing alloys.

FIG. 5 shows the PCT lines of the first hydrogen absorbing alloy, the second hydrogen absorbing alloy and a mixture the first and second hydrogen absorbing alloys as the subjects of measurement. Each of the PCT lines indicates the hydrogen absorption amount and the hydrogen pressure when the hydrogen absorbing alloy is in an equilibrium state in which the alloy absorbs hydrogen. The vertical axis indicates a log of equilibrium hydrogen pressure which is a hydrogen pressure in an equilibrium state, and the transverse axis indicates the hydrogen absorption amount (H/M). The curve L11 indicates the PCT line of the first hydrogen absorbing alloy, and the curve L13 indicates the PCT line of the second hydrogen absorbing alloy. The curve L12 indicates the PCT line when the first hydrogen absorbing alloy and the second hydrogen absorbing alloy are mixed in predetermined proportions. The mixture of the first hydrogen absorbing alloy and the second hydrogen absorbing alloy has an equilibrium dissociation pressure which is close to the equilibrium dissociation pressure of the first hydrogen absorbing alloy when the hydrogen absorption amount is low. When the hydrogen absorption amount is increased, the equilibrium dissociation pressure of the mixture of the first hydrogen absorbing alloy and the second hydrogen absorbing alloy becomes closer to the equilibrium dissociation pressure of the second hydrogen absorbing alloy. From the negative electrode potential behavior when the first hydrogen absorbing alloy and the second hydrogen absorbing alloy are mixed together, it can be understood that the hydrogen absorbing alloy to be hydrogenated is different from the hydrogen absorbing alloy to be dehydrogenated according to the negative electrode potential.

The difference between the hydrogen equilibrium dissociation pressure of the first hydrogen absorbing alloy and the hydrogen equilibrium dissociation pressure of the second hydrogen absorbing alloy is preferably 0.01 MPa or greater at 45° C. When the difference is 0.01 MPa or greater, a proper potential difference is caused between the potential of the first hydrogen absorbing alloy and the potential of the second hydrogen absorbing alloy at the start of charge. Also, a proper potential difference is caused between the potential of the first hydrogen absorbing alloy and the potential of the second hydrogen absorbing alloy at the start of discharge. Therefore, the starting of the dehydrogenation of the first hydrogen absorbing alloy can be limited during the dehydrogenation of the second hydrogen absorbing alloy in association with discharge. As one example, the hydrogen equilibrium dissociation pressure at 45° C. of the first hydrogen absorbing alloy is 0.005 MPa or greater, preferably 0.005 MPa or greater and 0.03 MPa or less. The hydrogen equilibrium dissociation pressure at 45° C. of the second hydrogen absorbing alloy is 0.03 MPa or greater, preferably 0.03 MPa or greater and 0.06 MPa or less. However, the hydrogen equilibrium dissociation pressure of the first hydrogen absorbing alloy and the hydrogen equilibrium dissociation pressure of the second hydrogen absorbing alloy are not limited to these values.

Figure 6A:
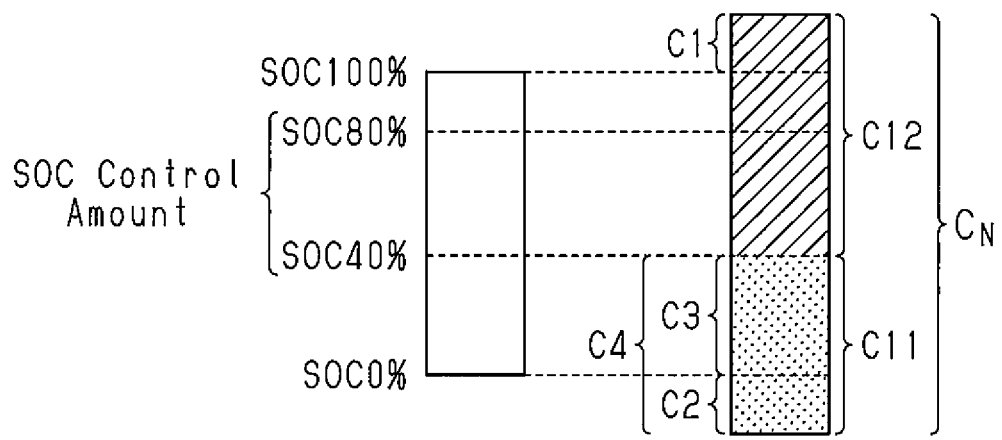
FIG. 6A is a diagram indicating the capacity of the first hydrogen absorbing alloy with respect to negative electrode capacity in one embodiment and shows a state where the capacity of the first hydrogen absorbing alloy is greater than or equal to a discharge reserve or greater.

Next, the proportions of the first hydrogen absorbing alloy and second hydrogen absorbing alloy to be included will be described with reference to FIG. 6. As shown in FIG. 6A, the SOC of the battery 10 is controlled, for example, by a controller which controls an electric motor, within an SOC control range of which lower limit value is "40%" and upper limit value is "80%." When the battery 10 is controlled so that the SOC of the battery 10 falls within the SOC control range, the positive electrode active substance and negative electrode active substance for a capacity C3 when the SOC of the battery 10 is "0%" or greater and less than "40%" would not be involved in the charge reaction or discharge reaction. Hereinafter, this capacity C3 is referred to as an "unused capacity C3." Although this capacity is theoretically an unused capacity, if a capacity balance deviation is caused among a plurality of single batteries 100 of the battery module 11, the positive electrode active substance and negative electrode active substance corresponding to the unused capacity C3 may be involved in the charge reaction and discharge reaction.

When at least the SOC of the battery 10 is controlled to "0%" or greater, the negative electrode active substance for a discharge reserve C2 in a negative electrode capacity $C_N$ is not involved in the charge reaction or discharge reaction. Specifically, as long as charge and discharge are controlled so that the SOC of the battery 10 falls within the SOC control range, the positive electrode active substance and negative electrode active substance for the unused capacity C3 and the negative electrode active substance for the discharge reserve C2 are not involved in the charge reaction or discharge reaction.

A capacity C11 of the first hydrogen absorbing alloy in the negative electrode capacity $C_N$ is less than a capacity C4 which is the sum of the discharge reserve C2 and the unused capacity C3. The proportion of the first hydrogen absorbing alloy in all of the hydrogen absorbing alloys is less than the proportion (C4/$C_N$) obtained by adding the proportion (C2/$C_N$) of the discharge reserve C2 to the negative electrode capacity $C_N$ and the capacity less than the lower limit value of SOC, i.e., the proportion ($C3/C_N$) of the unused capacity C3. The thus-added proportion ($C4/C_N$) corresponds to the proportion of the hydrogen absorbing alloy which is not directly involved in the charge reaction or discharge reaction in the hydrogen absorbing alloys. When the battery 10 is discharged from the state in which the SOC is 100%, the second hydrogen absorbing alloy is involved in the discharge reaction before the first hydrogen absorbing alloy. Accordingly, a capacity C12 of the second hydrogen absorbing alloy is arranged on a high SOC side, and the capacity C11 of the first hydrogen absorbing alloy is arranged on a low SOC side, in FIGS. 6A and 6B.

The negative electrode capacity γ per unit mass is represented by the following equation (1) where the capacity of the first hydrogen absorbing alloy per unit mass is expressed by "α (Ah/g)," the capacity of the second hydrogen absorbing alloy per unit mass is expressed by "β (Ah/g)," the proportion of the first hydrogen absorbing alloy to the mass of the entire hydrogen absorbing alloys is expressed by "X," and the negative electrode capacity per unit mass is expressed by "γ (Ah/g)." The negative electrode capacity "γ" is obtained by dividing the negative electrode capacity $C_N$ by the mass of the negative electrode. The proportion "X" is greater than 0 and less than 1. From the following equation (1), the proportion "X" is represented by the following equation (2).

$$\gamma = \alpha(1-X) + \beta X \quad (1)$$

$$X = (\gamma - \alpha)/(\beta - \alpha) \quad (2)$$

FIG. 6A shows a state in which the proportion of the first hydrogen absorbing alloy in all of the hydrogen absorbing alloys is maximal. Specifically, the capacity C11 of the second hydrogen absorbing alloy is the maximum value within a range of less than the capacity (C4) obtained by adding the discharge reserve C2 and the unused capacity C3.

Figure 6B:
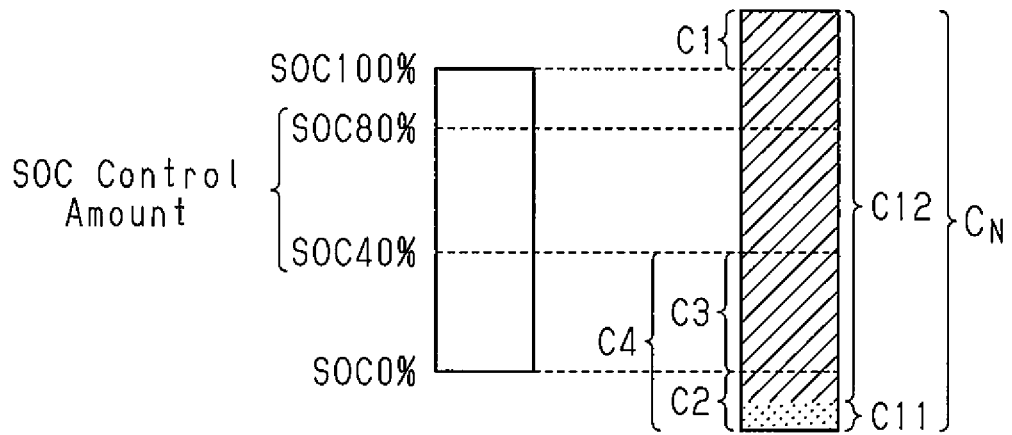
FIG. 6B is a diagram indicating the capacity of the first hydrogen absorbing alloy with respect to negative electrode capacity in one embodiment and shows a state where the capacity of the first hydrogen absorbing alloy is less than the discharge reserve.

FIG. 6B shows a state in which the proportion of the first hydrogen absorbing alloy in all of the hydrogen absorbing alloys is less than the proportion ($C2/C_N$) of the discharge reserve C2 to the negative electrode capacity $C_N$.

As described above, the battery 10 is set under positive electrode restriction in which the negative electrode capacity is greater than the positive electrode capacity. Specifically, since the theoretical negative electrode capacity needs to be greater than the theoretical positive electrode capacity, the content of the negative electrode active substance of the negative electrode mixture is necessarily greater than that of the positive electrode active substance of the positive electrode mixture. Thus, the content of the negative electrode active substance needs to be lowered to reduce the cost. However, if the content of the negative electrode active substance is merely reduced, the charge reserve and the discharge reserve would become small. The battery capacity would be reduced when the battery 10 is used under positive electrode restriction.

The hydrogen absorbing alloy includes the first hydrogen absorbing alloy and the second hydrogen absorbing alloy so that it is possible to significantly improve the output characteristics of the battery 10. Therefore, it is possible to reduce the content of the hydrogen absorbing alloy while ensuring the practical output characteristics of the on-board battery 10. Specifically, when "X" represents the theoretical positive electrode capacity, "Y" represents the theoretical negative electrode capacity, and "R" represents the AB ratio, in design, the ratio of the theoretical negative electrode capacity to the theoretical positive electrode capacity is necessarily 1.25 or greater and 1.40 or less ($1.25 \leq Y/X \leq 1.40$) and the AB ratio is 4.8 or greater and 5.4 or less ($4.8 \leq AB \leq 5.4$) in the nickel-metal hydride battery. In contrast, for the battery 10 including the hydrogen absorbing alloy composed of the first hydrogen absorbing alloy and the second hydrogen absorbing alloy, the value obtained by multiplying the ratio of the theoretical negative electrode capacity Y to the theoretical positive electrode capacity X necessary for the battery 10 by the AB ratio can be defined as falling within the range shown in following equation (3). The first hydrogen absorbing alloy and the second hydrogen absorbing alloy are $AB_5$-type hydrogen absorbing alloys, the main element of the element A is La, and the main element of the element B is Ni.

$$6.9 \leq (Y/X) \cdot R \leq 7.1 \quad (3)$$

When an attempt is made to obtain performance equivalent to the performance of the battery 10 by a conventional battery including one kind of hydrogen absorbing alloy, the value "(Y/X)·R" obtained by multiplying the ratio of the theoretical negative electrode capacity Y to the theoretical positive electrode capacity X by the AB ratio is 7.26 or greater and 7.4 or less. Since the value falls within the range as shown in equation (3) for the above battery 10, the theoretical negative electrode capacity can be reduced.

Figures 7, 8:
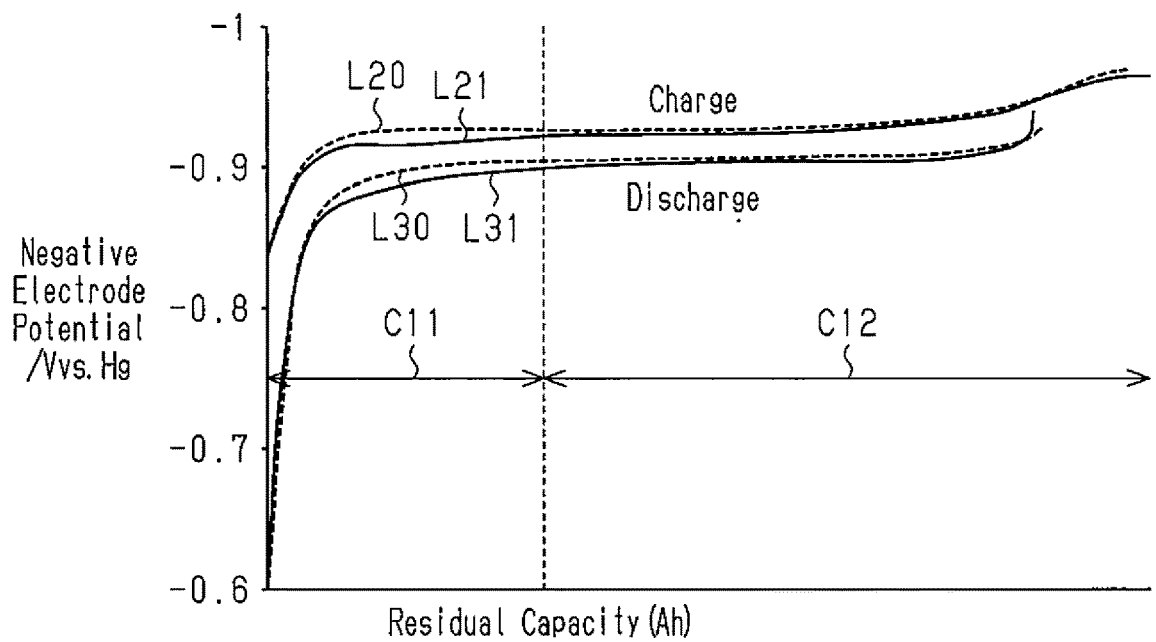
FIG. 7 is a graph showing charge and discharge characteristics of a negative electrode including a first hydrogen absorbing alloy and a second hydrogen absorbing alloy and charge and discharge characteristics of a negative electrode including a second hydrogen absorbing alloy.
FIG. 8 is a table showing the evaluation results of examples and comparative examples.

Next, the discharge characteristic and charge characteristic of a negative electrode including the first hydrogen absorbing alloy and the second hydrogen absorbing alloy will be described with reference to FIG. 7. The graph shown in FIG. 7 shows a discharge curve and a charge curve indicating the change in negative electrode potential to the residual capacity of the negative electrode. The negative electrode potential is obtained by inserting a reference electrode into the single battery 100 and measuring the potential to the reference electrode while discharging and charging the single battery 100. The transverse axis in the graph indicates the residual capacity of the negative electrode, and the vertical axis therein indicates the negative electrode potential. The difference between the hydrogen equilibrium dissociation pressure of the first hydrogen absorbing alloy and the hydrogen equilibrium dissociation pressure of the second hydrogen absorbing alloy is 0.01 MPa or greater at 45° C.

In the two upper charge curves in FIG. 7, a charge curve L21 shown by a solid line is a charge curve for a negative electrode including the hydrogen absorbing alloy of the present embodiment, and a charge curve L20 shown by a broken line is a charge curve for a negative electrode including the second hydrogen absorbing alloy alone. The vertical axis indicates the negative electrode potential, and the potential becomes lower (absolute value becomes greater) toward the upper part. The charge curves L20, L21 are obtained by starting charge from a state in which the SOC of the negative electrode is less than "0%" and measuring the negative electrode potential. When the residual capacity of the negative electrode is small, the potential of the negative electrode of the present embodiment (charge curve L21) is higher (the absolute value thereof is smaller) than the potential of the negative electrode including the second hydrogen absorbing alloy alone (charge curve L20), under the conditions that they are identical in residual capacity. That is to say, the hydrogenation of the first hydrogen absorbing alloy progresses first in an early stage of charge from the state in which the SOC of the negative electrode is less than "0%". When the first hydrogen absorbing alloy is charged at least for a capacity C11 thereof, the charge of the second hydrogen absorbing alloy is started, and thus the negative electrode potential on the charge curve L21 and the negative electrode potential on the charge curve L20 are identical with each other.

In the two lower discharge curves in FIG. 7, a curve L31 shown by a solid line is a discharge curve for a negative electrode including the hydrogen absorbing alloy of the present embodiment, and a curve L30 shown by a broken line is a discharge curve for a negative electrode including the second hydrogen absorbing alloy alone. When the residual capacity of the negative electrode is large, the potential of the negative electrode of the present embodiment (curve L31) is almost the same as the potential of the negative electrode including the second hydrogen absorbing alloy alone (curve L30), under the conditions that they are identical in residual capacity. That is to say, it is indicated that the dehydrogenation of the second hydrogen absorbing alloy progresses first in an early stage of discharge. When the second hydrogen absorbing alloy is discharged at least for a capacity C12 thereof, the discharge of the first hydrogen absorbing alloy is started. Therefore, when the residual capacity of the negative electrode is small, the potential of the negative electrode of the present embodiment (curve L31) is higher (the absolute value thereof is smaller) than the potential of the negative electrode including the second hydrogen absorbing alloy alone (curve L30), under the conditions that they are identical in residual capacity.

Hence, when the above proportion is employed as the proportion of the first hydrogen absorbing alloy in the negative electrode, the first hydrogen absorbing alloy which is easily pulverized is not directly involved in the charge reaction or discharge reaction. Therefore, if the battery 10 is controlled so that the SOC of the battery 10 falls within the SOC control range, the hydrogenation and dehydrogenation of the first hydrogen absorbing alloy are suppressed. Thus, when the battery 10 is used, the corrosion of the first hydrogen absorbing alloy can be suppressed. Further, the pulverization in association with charge and discharge is hard to progress because of the low pulverizability of the second hydrogen absorbing alloy.

Before the battery 10 is shipped out from the factory, the initial activation step is carried out, which involves repeating the charge until the SOC of the positive electrode reaches "100%" and the discharge until the negative electrode capacity reaches a capacity which allows pulverization of the first hydrogen absorbing alloy, respectively, ten times. The phrase "the negative electrode capacity reaches a capacity which allows pulverization of the first hydrogen absorbing alloy" refers to a capacity which is "0" or greater (i.e., in a state where the negative electrode has no charged portion (hydrogenated portion)) and which is less than the capacity C11 that is the capacity for the first hydrogen absorbing alloy. The first hydrogen absorbing alloy is pulverized by this step, for example, before shipping of the battery 10. When the battery 10 is used as a power source for an electric motor, the state in which the first hydrogen absorbing alloy is pulverized in the initial activation step would be almost maintained. Since the first hydrogen absorbing alloy tends to be more easily pulverized than the second hydrogen absorbing alloy, the first hydrogen absorbing alloy is preliminarily pulverized, so that it is possible to increase the exposed area of the highly conductive metal. Since the internal resistance of the negative electrode is thus reduced, it is possible to improve the output characteristics of the battery 10.

Further, as show in FIG. 6B, when the proportion of the first hydrogen absorbing alloy in all of the hydrogen absorbing alloys is less than the proportion ($C2/C_N$) of the discharge reserve C2 to the negative electrode capacity $C_N$, the capacity balance is lost among the plurality of single batteries 100 which form the battery module 11, and, even when the discharge reserve is decreased, it is possible to prevent the involvement of the first hydrogen absorbing alloy in the charge reaction and discharge reaction or to decrease a portion of the first hydrogen absorbing alloy, which is involved in the charge reaction and discharge reaction.

It has already been confirmed that, when the difference in hydrogen equilibrium dissociation pressure at 45° C. between the first hydrogen absorbing alloy and the second hydrogen absorbing alloy is 0.01 MPa or greater, the output characteristics of the battery 10 are improved.

It is known that, in some nickel-metal hydride batteries, a minor amount of hydrogen desorbed by the hydrogen absorbing alloy permeates the case 110 and continues to be leaked to the outside. This phenomenon especially tends to take place in the case where the battery case is made of a resin. When hydrogen is leaked to the outside in this way, hydrogen is discharged from the hydrogen absorbing alloy of the negative electrode according to the hydrogen leakage amount in order to keep the equilibrium of the partial pressure of hydrogen within the case 110. Thus, there is a possibility that the discharge reserve C2 of the negative electrode would decrease, and finally disappear. However, when the hydrogen absorbing alloy includes the first hydrogen absorbing alloy and the second hydrogen absorbing alloy, the first hydrogen absorbing alloy having a low hydrogen equilibrium dissociation pressure is included, so that the amount of hydrogen to permeate the resin and to be desorbed to the outside can be reduced as compared with a battery in which all the hydrogen absorbing alloys included in the negative electrode are second hydrogen absorbing alloys. Accordingly, the first hydrogen absorbing alloy and the second hydrogen absorbing alloy are mixed to form a negative electrode, to thereby make it possible to improve the lifetime of the battery 10.

As described above, the first embodiment will provide advantageous effects listed below.

(1) The negative electrode has the first hydrogen absorbing alloy having a low hydrogen equilibrium dissociation pressure and high pulverizability and the second hydrogen absorbing alloy having a high hydrogen equilibrium dissociation pressure and low pulverizability. The second hydrogen absorbing alloy has a hydrogen equilibrium dissociation pressure higher than the hydrogen equilibrium dissociation pressure of the first hydrogen absorbing alloy, so that the potential at which the hydrogenation reaction and the dehydrogenation reaction are started is on a negative electrode potential side in a full-charge state. Therefore, when the negative electrode is charged until the charge rate thereof is changed from 0% to 100%, the charge reaction of the first hydrogen absorbing alloy is started and progresses, and then the charge reaction of the second hydrogen absorbing alloy is started. When the negative electrode is discharged until the charge rate thereof is changed from 100% to 0%, the discharge reaction of the second hydrogen absorbing alloy is started and progresses, and then the discharge reaction of the first hydrogen absorbing alloy is started. Since the above proportion is employed as the proportion of the first hydrogen absorbing alloy, if the nickel-metal hydride battery is controlled within a range of the lower limit value or greater of the charge rate of the positive electrode, the first hydrogen absorbing alloy is not directly involved in the charge reaction or discharge reaction. Thus, only the second hydrogen absorbing alloy having low pulverizability can be directly involved in the charge reaction and discharge reaction. The first hydrogen absorbing alloy having high pulverizability is not allowed to be directly involved in the charge reaction or discharge reaction, whereby the pulverization of the first hydrogen absorbing alloy can be suppressed. As a result, the corrosion of the entire hydrogen absorbing alloys can be suppressed. In the production step and the like, the first hydrogen absorbing alloy is preliminarily pulverized, for example, by performing a plurality of times of the cycle of charge and discharge that reaches the charge rate allowing pulverization of the first hydrogen absorbing alloy. Due to this, when the nickel-metal hydride battery is used as a power source, a state in which the exposed area of the highly conductive metal is increased in the negative electrode would be maintained also during the repeated charge and discharge reactions. Therefore, it is possible to improve the output characteristics of the battery while suppressing the corrosion of the hydrogen absorbing alloys. Accordingly, the output characteristics and the corrosion resistance can both be improved.

(2) When the first hydrogen absorbing alloy and second hydrogen absorbing alloy are $AB_5$-type hydrogen absorbing alloys, the AB ratio of the second hydrogen absorbing alloy is greater than that of the first hydrogen absorbing alloy. Therefore, there is caused a difference also in hydrogen equilibrium dissociation pressure according to the difference in AB ratio. Such a difference in hydrogen equilibrium dissociation pressure corresponds to, in other words, a proper potential difference between the potential of the first hydrogen absorbing alloy and the potential of the second hydrogen absorbing alloy when charge and discharge are started. By adjusting the difference in AB ratio to 0.1 or greater, the start of hydrogenation of the first hydrogen absorbing alloy in the middle of charge and the start of dehydrogenation of the first hydrogen absorbing alloy in the middle of discharge can be suppressed if the battery 10 is controlled within a range of the lower limit value or greater of the charge rate of the positive electrode determined based on the control range of the battery 10.

(3) When "X" represents the theoretical positive electrode capacity, "Y" represents the theoretical negative electrode capacity, and "R" represents the AB ratio, the first hydrogen absorbing alloy and second hydrogen absorbing alloy satisfy the equation of "$6.9 \leq (Y/X) \cdot R \leq 7.1$." The nickel-metal hydride battery is set under positive electrode restriction in which the negative electrode capacity is greater than the positive electrode capacity, and the theoretical negative electrode capacity needs to be made greater than the theoretical positive electrode capacity. Therefore, the content of the negative electrode active substance of the negative electrode mixture is necessarily greater than that of the positive electrode active substance of the positive electrode mixture. When the above range is satisfied for the first hydrogen absorbing alloy and second hydrogen absorbing alloy, it is possible to decrease the ratio of the theoretical negative electrode capacity to the theoretical positive electrode capacity while well keeping the effect of reducing the internal resistance. Therefore, the content of the negative electrode active substance can be decreased.

(4) The mixing of cobalt with the hydrogen absorbing alloy can suppress lattice expansion which is caused by the hydrogenation of the hydrogen absorbing alloy and suppress the pulverization of the hydrogen absorbing alloy. The addition of cobalt to the hydrogen absorbing alloy can prevent the elution of manganese which is included as the hydrogen absorbing alloy. According to the above configuration, the cobalt content of the second hydrogen absorbing alloy is greater than that of the first hydrogen absorbing alloy, and thus the pulverizability of the second hydrogen absorbing alloy can be lowered.

(5) When the proportion of the first hydrogen absorbing alloy in all of the hydrogen absorbing alloys is not less than the proportion of the discharge reserve C2, the exposed area of the highly conductive metal is increased as compared with a battery in which the proportion of the first hydrogen absorbing alloy is less than the proportion of the discharge reserve C2. Therefore, the output characteristics of the battery 10 can be improved.

(6) When the proportion of the first hydrogen absorbing alloy in all of the hydrogen absorbing alloys is less than the proportion of the discharge reserve C2 to the negative electrode capacity $C_N$, the capacity balance is lost among the single batteries 100, so that it is possible to prevent the involvement of the first hydrogen absorbing alloy in the charge reaction and discharge reaction or to reduce a portion of the first hydrogen absorbing alloy, which is involved in the charge reaction and discharge reaction, even when the discharge reserve C2 of the single batteries 100 is reduced. Therefore, the corrosion resistance can be improved by suppressing the pulverization of the first hydrogen absorbing alloy.

(7) The proportion of the first hydrogen absorbing alloy in all of the hydrogen absorbing alloys is less than the proportion obtained by adding the proportion ($C2/C_N$) of the discharge reserve C2 to the negative electrode capacity $C_N$ and the proportion of the capacity when the SOC of the positive electrode is 0% or greater and less than 40% to the negative electrode capacity $C_N$. Therefore, when the battery 10 is also used as a power source for hybrid vehicles, the proportion of the first hydrogen absorbing alloy can be set to a proportion which does not allow direct involvement of the first hydrogen absorbing alloy in the charge reaction or discharge reaction.

(8) The difference between the hydrogen equilibrium dissociation pressure of the second hydrogen absorbing alloy and the hydrogen equilibrium dissociation pressure of the first hydrogen absorbing alloy is 0.01 MPa or greater. Thus, a proper potential difference is caused between the potential of the first hydrogen absorbing alloy and the potential of the second hydrogen absorbing alloy at the start of charge. Further, a proper potential difference is caused between the potential of the first hydrogen absorbing alloy and the potential of the second hydrogen absorbing alloy at the start of discharge. Therefore, if charge and discharge are controlled so that the SOC of the battery 10 falls within the SOC control range, the first hydrogen absorbing alloy can be made not to be directly involved in the charge reaction or discharge reaction.

(9) The negative electrode including the first hydrogen absorbing alloy having a low hydrogen equilibrium dissociation pressure and the second hydrogen absorbing alloy having a high hydrogen equilibrium dissociation pressure is accommodated in the case 110 made of a resin. When the battery 10 is controlled so that the SOC of the battery 10 falls within the SOC control range, hydrogen is hard to be desorbed from the first hydrogen absorbing alloy. Hence, the amount of hydrogen to permeate the resin and to be desorbed to the outside can be reduced as compared with a battery in which all the hydrogen absorbing alloys included in the negative electrode are second hydrogen absorbing alloys.

EXAMPLES

Hereinafter, example 1 and comparative example 1 will be described. The examples are not intended to limit the present invention.

Example 1

A hydrogen absorbing alloy was made by the following method. Firstly, there was provided a misch metal including an alloyed mixture of rare earth elements such as La, Ce, Pr (praseodymium), Nd (neodymium) and Sm (samarium), in particular, lanthanum-based elements. As a preparation step, this misch metal and Ni, Co, Mn and Al were blended so as to attain the predetermined composition to prepare a raw material composition. Further, as the production step, a hydrogen absorbing alloy was produced by melting the prepared raw material composition and then subjecting the molten composition to a so-called melt quenching method in which the cooling speed from the molten state to solidification was set to 1000° C./sec. or greater. In this case, rapid cooling of the molten raw material composition leads to the production of a hydrogen absorbing alloy having a small variation in distribution of the compositional components. The weight ratios of Al and Mn to the entire hydrogen absorbing alloys are adjusted, so that the proportion of a cross section where Al and Mn are segregated and present in a relatively high concentration is controlled among the cross sections of the hydrogen absorbing alloys. Then, the produced hydrogen absorbing alloys were crushed with a ball mill to make a first hydrogen absorbing alloy powder.

A second hydrogen absorbing alloy was made in the same manner as in the first hydrogen absorbing alloy while the composition of the misch metal and Ni, CO, Mn and Al was changed. The hydrogen equilibrium dissociation pressure of the second hydrogen absorbing alloy was higher than that of the first hydrogen absorbing alloy at 45° C., and the difference therebetween was 0.036 MPa. Further, in terms of the magnetic susceptibility measured with a VSM (manufactured by TOEI INDUSTRY CO., LTD.), the first hydrogen absorbing alloy was higher than the second hydrogen absorbing alloy. The proportion of the first hydrogen absorbing alloy was adjusted to 30% by mass relative to the hydrogen absorbing alloys.

Next, the hydrogen absorbing alloy powder was immersed and stirred in an aqueous alkali solution, and then washed with water and dried. Further, a thickener such as carboxymethyl cellulose and a binder such as a styrene-butadiene copolymer were added to the dried hydrogen absorbing alloy powder, and they were kneaded together to make a paste. This paste was applied to a punching metal, and the paste-coated metal was dried, rolled and cut to make a negative electrode plate.

A positive electrode plate was made by charging an active substance paste including nickel hydroxide as the main component into a foamed nickel substrate, followed by drying, rolling and cutting. A plurality of the above positive electrode plates and a plurality of the above negative electrode plates were laminated via separators made of a nonwoven fabric of an alkali-resistant resin, and accommodated in a battery container together with an alkali electrolyte solution including potassium hydroxide (KOH) as the main component, to thereby make a single battery as a nickel-metal hydride battery.

Comparative Example 1

A single battery was made in the same manner as the above example except in that the negative electrode was formed from only the second hydrogen absorbing alloy of the example.

Next, the output characteristics of the single battery according to example 1 and the single battery according to comparative example 1 were evaluated as follows.

Method for measuring value of initial internal resistance relative to direct current (DC-IR)

First, two single batteries of example 1 and two single batteries of comparative example 1 were charged until the charge rate (SOC: State Of Charge) of the respective single batteries reached 60% under normal temperatures. Then, for one single battery of example 1 and one single battery of comparative example 1, the voltage drop ($\Delta V$) when the nickel-metal hydride battery was discharged at a constant current value for 5 seconds at a temperature of 25° C. was used to calculate the direct current internal resistance (DC-IR) of the nickel-metal hydride battery by the "$\Delta V$/current value."

The one single battery of example 1 and the one single battery of comparative example 1, which were charged until the SOC reached 60%, were each cooled to −30° C., and then the direct current internal resistance was calculated in the same manner as in the case of the temperature condition of 25° C. Then, for each temperature condition, the percentage obtained by dividing the difference AR obtained by subtracting the direct current internal resistance of the single battery of example 1 from the direct current internal resistance of the single battery of Comparative Example 1 by the direct current internal resistance of comparative example 1 was determined, and "100%" was added to the percentage. FIG. 8 shows the results. A value of 100% or greater indicates that the direct current internal resistance of Example 1 was lowered relative to that of comparative example 1.

Method for measuring high-rate internal pressure after 250 cycles of durability test Single batteries of example 1 and comparative example 1 were charged and discharged at 20 A and under a temperature of 35° C. and a range for SOC of 20% or greater and 80% or less, and this processing was defined as 1 cycle. Two hundred and fifty (250) cycles of this durability test were conducted to measure the internal pressure of each of the single batteries. Then, the difference AP obtained by subtracting the internal pressure of the single battery of example 1 from the internal pressure of the single battery of comparative example 1 was determined, and the percentage obtained by dividing the difference AP by the internal pressure of comparative example 1 was determined. Then, "100%" was added to the percentage. The results are indicated in the table in FIG. 8. A value of 100% or greater indicates that the internal pressure of example 1 was decreased relative to that of comparative example 1. The internal pressure was preferably around the atmospheric pressure, and comparative example 1 was in a pressure state higher than the atmospheric pressure.

Method for measuring internal resistance value (DC-IR) after 250 cycles of durability test For two single batteries of example 1 and two single batteries of comparative example 1, the internal resistance value of each of the single batteries was measured after 250 cycles of the above durability test. The temperature conditions used were 25° C. and −30° C. The internal resistance was measured in the same manner as the initial internal resistance value.

For each temperature condition, the difference AR obtained by subtracting the direct current internal resistance of the single battery of example 1 subjected to the durability test at 25° C. from the direct current internal resistance of the single battery of comparative example 1 was determined, and the percentage obtained by dividing the difference AR by the direct current internal resistance of comparative example 1 was determined. Then, "100%" was added to the percentage. The results are indicated in the table in FIG. 8. A value of 100% or greater indicates that the direct current internal resistance of example 1 was decreased relative to that of comparative example 1.

From the evaluation results shown in FIG. 8, it can be understood that the single battery of example 1 was improved in output characteristics as compared with the single battery of comparative example 1 both in the initial stage and after the durability test. Even when the temperature was changed, the output characteristics of the single battery of example 1 were improved as compared with those of the single battery of comparative example 1. Further, it can be understood that the internal pressure of the battery of example 1 was lower than that of the battery of comparative example 1.

Example 2

A negative electrode was formed in the same manner as in example 1 except in the following conditions.

The first hydrogen absorbing alloy did not include cobalt, and the cobalt content of the second hydrogen absorbing alloy was adjusted to 0.2 mol/g or greater and 0.5 mol/g or less.

The hydrogen equilibrium dissociation pressure at 45° C. of the first hydrogen absorbing alloy was adjusted to 0.005 MPa or greater and 0.03 MPa or less. The hydrogen equilibrium dissociation pressure at 45° C. of the second hydrogen absorbing alloy had a difference of 0.01 MPa or greater from the hydrogen equilibrium dissociation pressure at 45° C. of the first hydrogen absorbing alloy, and was adjusted to 0.03 MPa or greater and 0.06 MPa or less.

The length of axis a and length of axis b of the first hydrogen absorbing alloy were adjusted to 5.04 Å or greater and 5.06 Å or less. The length of axis a and length of axis b of the second hydrogen absorbing alloy were adjusted to 5.00 Å or greater and 5.03 Å or less. In this embodiment, the length of axis a and length of axis b of each of the hydrogen absorbing alloys were the same. Therefore, the length of axis a will be described hereinafter, and the length of axis b will not be described.

The difference between the length of axis a of the first hydrogen absorbing alloy and the length of axis a of the second hydrogen absorbing alloy was adjusted to 0.02 Å or greater. Specifically, the length of axis a of the first hydrogen absorbing alloy was longer than the length of axis a of the second hydrogen absorbing alloy, and the difference between the length of axis a of the first hydrogen absorbing alloy and the length of axis a of the second hydrogen absorbing alloy was 0.02 Å or greater.

The proportion of the first hydrogen absorbing alloy is preferably 10% by mass or greater and 30% by mass or less, more preferably 15% by mass or greater and 25% by mass or less, relative to the entire hydrogen absorbing alloys.

Further, the evaluation value obtained by the product of "the length of axis a [Å] of the first hydrogen absorbing alloy" and "the proportion of the first hydrogen absorbing alloy to all of the hydrogen absorbing alloys" was adjusted to "0.7" or greater and "1.4" or less.

A paste formed from the hydrogen absorbing alloy powder was applied to a punching metal, and the paste-coated metal was dried, rolled and cut to make a negative electrode plate. Then, the negative electrode plate and the positive electrode plate of example 1 were used to form a single battery as a nickel-metal hydride battery.

Comparative Example 2

A single battery was formed in the same manner as in example 2 except in that the negative electrode was adjusted so that, for the hydrogen absorbing alloys of example 2, the evaluation value obtained by the product of "the length of axis a [Å] of the first hydrogen absorbing alloy" and "the proportion of the first hydrogen absorbing alloy in all of the hydrogen absorbing alloys" was less than "0.7" or greater than "1.4".

Relationship of internal resistance and internal pressure with evaluation value

A plurality of the secondary batteries according to example 2 and a plurality of the secondary batteries according to comparative example 2 were formed to measure the internal resistance and the internal pressure. Here, the internal resistance is an initial internal resistance value (DC-IR). The internal pressure is a high-rate internal pressure after 250 cycles of the durability test, and was measured by the same method as in the method for measuring the internal pressure in example 1 and comparative example 1 described above. The relationship of the internal resistance and internal pressure with the evaluation value calculated by "the length of axis a[Å] of the first hydrogen absorbing alloy" x "the proportion of the first hydrogen absorbing alloy in all of the hydrogen absorbing alloys" is shown in a graph.

Figure 9:
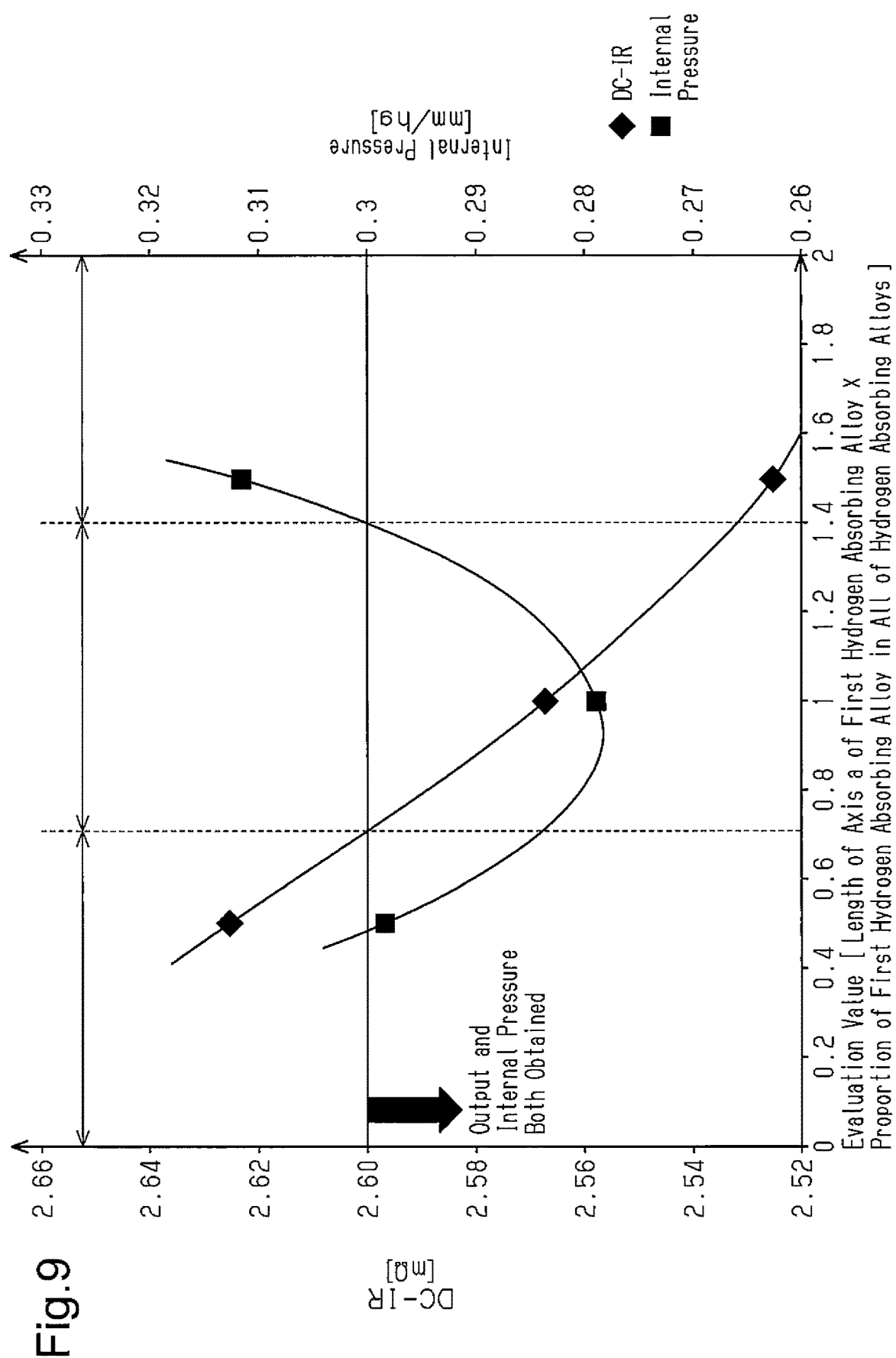
FIG. 9 is a graph showing the measurement results of the internal resistance and internal pressure of examples and comparative examples.

As shown in the graph of FIG. 9, the DC-IR has a negative proportional relationship with the evaluation value, and lowers as the evaluation value increases. In this embodiment, for example, a single battery having DC-IR which is the predetermined threshold value or less (here, 2.6 [mΩ] or less) is regarded as a satisfactory single battery, among the made single batteries. This threshold value can be determined in advance, for example, based on experiments, theory and experience. With reference to the graph in FIG. 9, it is indicated that when the evaluation value is "0.7" or greater, the DC-IR falls within a satisfactory range, i.e., 2.6 [mΩ] or less.

The internal pressure is obtained as an approximately secondary curve which is convex downward, and has the minimum value when the evaluation value is around "1," and becomes greater as the evaluation value departs from "1." Here, the minimum value of the internal pressure is about "0.28." In this embodiment, for example, a single battery having an internal pressure of the predetermined threshold value or less (here, 0.3 [mm/hg] or less) is regarded as a satisfactory single battery, among the formed single batteries. The threshold value can be determined in advance, for example, based on experiments, theory and experience. With reference to the graph in FIG. 9, it is indicated that when the evaluation value is "0.5" or greater and "1.4" or less, the internal pressure falls within a satisfactory range, i.e., 0.3 [mm/hg] or less.

In view of the above, in order that the DC-IR falls within a satisfactory range and the internal pressure falls within a satisfactory range, the evaluation value is required to be preferably "0.7" or greater and "1.4" or less. In other words, a secondary battery in which the evaluation value falls within the range of "0.7" or greater and "1.4" or less can obtain the output characteristics and the internal pressure in a satisfactory manner.

OTHER EMBODIMENTS

It should be apparent to those skilled in the art that the present invention may be embodied in many other specific forms without departing from the spirit or scope of the invention. Particularly, it should be understood that the present invention may be embodied in the following forms.

The hydrogen absorbing alloy of the negative electrode mixture may be composed of at least three kinds of hydrogen absorbing alloys. When the hydrogen absorbing alloy includes at least three kinds of hydrogen absorbing alloys, hydrogen absorbing alloys having a hydrogen equilibrium dissociation pressure which allow direct involvement in discharge and charge when the battery is used as a power source are the second hydrogen absorbing alloys. The first hydrogen absorbing alloys are hydrogen absorbing alloys having a hydrogen equilibrium dissociation pressure lower than the hydrogen equilibrium dissociation pressure of the hydrogen absorbing alloy having the lowest hydrogen equilibrium dissociation pressure among the second hydrogen absorbing alloys. Also, at least one kind, among the first hydrogen absorbing alloys, has pulverizability higher than the pulverizability of the second hydrogen absorbing alloy.

The battery module 11 is provided with six battery containers but may be provided with any other number of battery containers.

The battery 10 is an assembled battery formed by a plurality of battery modules 11 in the above embodiment. However, the battery 10 may be either one battery module 11 or a single battery.

In the above embodiments, the case where the state of charge for the power storage amount of the battery 10 is represented as SOC has been exemplified. Instead, the state of charge of the battery 10 may be an actual power storage amount (amount of charge). Normally, the power storage amount (amount of charge) and SOC can be exchanged.

In the initial activation step of the battery 10, the charging until the SOC of the positive electrode reaches "100%" is repeated ten times, and the discharging until the negative electrode capacity reaches the capacity that allows pulverization of the first hydrogen absorbing alloy is repeated ten times. However, such processes may be repeated for a number of times other than ten. Alternatively, the charging and the discharging may each be performed only once. Also, the change in the initial activation step may be performed either until the SOC of the positive electrode reaches a predetermined rate which is less than "100%" or until the SOC of the positive electrode reaches a predetermined rate which is greater than "100%."

In the above embodiments, "the lower limit value of the charge rate of the positive electrode" used in the determination of the proportion of the first hydrogen absorbing alloy is defined as 40%, but may be changed, for example, in accordance with the SOC control range in hybrid vehicles.

In the above embodiments, "the lower limit value of the charge rate of the positive electrode" used in the determination of the proportion of the first hydrogen absorbing alloy is defined as the lower limit value of the charge rate when the battery 10 is used as a power source. In addition to this, "the lower limit value of the charge rate of the positive electrode" may be the lower limit value of the charge rate with some margin when the battery 10 is used as a power source.

In the above embodiments, the battery 10 is used as a power source for an electric motor installed in hybrid vehicles, but may be used as a power source for any other devices installed in hybrid vehicles or any other vehicles. The battery 10 may also be used as a power source for any other purpose than the power source for vehicles, such as a fixed power source, as long as the battery 10 is used as a power source. For example, the fixed power source is generally set to have a large SOC control range as compared with the power source for an electric motor. Accordingly, the proportion of the first hydrogen absorbing alloy has only to be set according to the SOC control range.

The lower limit value of the SOC control range may be "0%." In this case, the proportion of the first hydrogen absorbing alloy is defined as less than the proportion of the discharge reserve C2 to the negative electrode capacity.

In the above embodiments, "$6.9 \leq (Y/X) \cdot R \leq 7.1$" is satisfied when the first hydrogen absorbing alloy and the second hydrogen absorbing alloy are $AB_5$-type hydrogen absorbing alloys, the main element of the element A is La, the main element of the element B is Ni, "X" represents the theoretical positive electrode capacity, "Y" represents the theoretical negative electrode capacity, and "R" represents the AB ratio. However, as long as the output characteristics and the corrosion resistance are both improved, the value obtained by multiplying the ratio of the theoretical negative electrode capacity to the theoretical positive electrode capacity by the AB ratio does not need to satisfy the above range.

In the above embodiments, the pulverizability of the first hydrogen absorbing alloy is higher than that of the second hydrogen absorbing alloy, and the AB ratio of the first hydrogen absorbing alloy is greater than that of the second hydrogen absorbing alloy by at least 0.1. However, the first hydrogen absorbing alloy only has to have a pulverizability higher than the pulverizability of the second hydrogen absorbing alloy, and a proper potential difference according to the use manner of the battery 10 only has to be produced between the potential of the first hydrogen absorbing alloy and the potential of the second hydrogen absorbing alloy. The difference in AB ratio may be less than 0.1.

In the above embodiments, the length of axis a and length of axis b of the hydrogen absorbing alloy are defined as identical with each other. However, the length of axis a and length of axis b of the hydrogen absorbing alloy may be different from each other as long as the lengths fall within the ranges of the length of axis a and length of axis b of each of the hydrogen absorbing alloys.

The battery 10 may be used as a power source for an electric motor installed in electric vehicles.

The present examples and embodiments are to be considered as illustrative and not restrictive, and the invention is not to be limited to the details given herein, but may be modified within the scope and equivalence of the appended claims.

The invention claimed is:

1. A nickel-metal hydride battery comprising:
   a positive electrode; and
   a negative electrode including hydrogen absorbing alloys, wherein:
     a capacity of the negative electrode includes a discharge reserve that is a capacity exceeding a capacity of the positive electrode,
     the hydrogen absorbing alloys of the negative electrode include a first hydrogen absorbing alloy and a second hydrogen absorbing alloy having a higher hydrogen equilibrium dissociation pressure than the first hydrogen absorbing alloy, each hydrogen absorbing alloy includes an element A having high affinity for hydrogen and an element B having low affinity for hydrogen, wherein when a ratio of a substance amount of the element B to a substance amount of the element A is referred to as an AB ratio, the AB ratio of the second hydrogen absorbing alloy is greater than an AB ratio of the first hydrogen absorbing alloy, a proportion of the first hydrogen absorbing alloy in all of the hydrogen absorbing alloys is less than a sum of a proportion of the discharge reserve in the entire capacity of the negative electrode and a proportion of a capacity of a portion corresponding to a lower limit value of 0% or greater of a charge rate of the positive electrode in the negative electrode in the entire capacity of the negative electrode, the first hydrogen absorbing alloy and the second hydrogen absorbing alloy are AB5-type hydrogen absorbing alloys, a main element of the element A is La, and a main element of the element B is Ni, and $6.9 \leq (Y/X) R \leq 7.1$ is satisfied, where "X" represents a theoretical positive electrode capacity, "Y" represents a theoretical negative electrode capacity, and "R" represents the AB ratio.

2. The nickel-metal hydride battery according to claim 1, wherein the AB ratio of the second hydrogen absorbing alloy is greater than the AB ratio of the first hydrogen absorbing alloy by at least 0.1.

3. The nickel-metal hydride battery according to claim 1, wherein a cobalt content of the second hydrogen absorbing alloy is greater than a cobalt content of the first hydrogen absorbing alloy.

4. The nickel-metal hydride battery according to claim 1, wherein the proportion of the first hydrogen absorbing alloy to the all of the hydrogen absorbing alloys is greater than or equal to the proportion of the discharge reserve in the capacity of the negative electrode.

5. The nickel-metal hydride battery according to claim 1, wherein the lower limit value is a lower limit value of the charge rate of the positive electrode when the nickel-metal hydride battery is used as a power source.

6. The nickel-metal hydride battery according to claim 1, wherein the lower limit value is 40%.

7. The nickel-metal hydride battery according to claim 1, wherein a difference in hydrogen equilibrium dissociation pressure at 45° C. between the second hydrogen absorbing alloy and the first hydrogen absorbing alloy is 0.01 MPa or greater.

8. The nickel-metal hydride battery according to claim 1, wherein the positive electrode and the negative electrode are accommodated in a resin case.

9. The nickel-metal hydride battery according to claim 1, wherein at least one of a product of a length of axis a of a unit lattice of the first hydrogen absorbing alloy and the proportion of the first hydrogen absorbing alloy in all of the hydrogen absorbing alloys and a product of a length of axis b of the unit lattice of the first hydrogen absorbing alloy and the proportion of the first hydrogen absorbing alloy in all of the hydrogen absorbing alloys is 0.7 or greater and 1.4 or less.

10. A nickel-metal hydride battery comprising:

a positive electrode; and a negative electrode including hydrogen absorbing alloys, wherein:

a capacity of the negative electrode includes a discharge reserve that is a capacity exceeding a capacity of the positive electrode, the hydrogen absorbing alloys of the negative electrode include a first hydrogen absorbing alloy and a second hydrogen absorbing alloy having a higher hydrogen equilibrium dissociation pressure than the first hydrogen absorbing alloy, each hydrogen absorbing alloy includes an element A having high affinity for hydrogen and an element B having low affinity for hydrogen, wherein when a ratio of a substance amount of the element B to a substance amount of the element A is referred to as an AB ratio, the AB ratio of the second hydrogen absorbing alloy is greater than an AB ratio of the first hydrogen absorbing alloy, a proportion of the first hydrogen absorbing alloy in all of the hydrogen absorbing alloys is less than a sum of a proportion of the discharge reserve in the entire capacity of the negative electrode and a proportion of a capacity of a portion corresponding to a lower limit value of 0% or greater of a charge rate of the positive electrode in the negative electrode in the entire capacity of the negative electrode, and the proportion of the first hydrogen absorbing alloy in all of the hydrogen absorbing alloys is less than the proportion of the capacity of the discharge reserve in the capacity of the negative electrode.

\* \* \* \* \*